United States Patent
Mraz et al.

(10) Patent No.: US 9,380,064 B2
(45) Date of Patent: Jun. 28, 2016

(54) SYSTEM AND METHOD FOR IMPROVING THE RESILIENCY OF WEBSITES AND WEB SERVICES

(71) Applicant: Owl Computing Technologies, Inc., Ridgefield, CT (US)

(72) Inventors: Ronald Mraz, South Salem, NY (US); Gabriel Silberman, Hastings on Hudson, NY (US)

(73) Assignee: Owl Computing Technologies, Inc., Ridgefield, CT (US)

( * ) Notice: Subject to any disclaimer, the term of this patent is extended or adjusted under 35 U.S.C. 154(b) by 162 days.

(21) Appl. No.: 13/940,448

(22) Filed: Jul. 12, 2013

(65) Prior Publication Data

US 2015/0020194 A1    Jan. 15, 2015

(51) Int. Cl.
  G06F 11/00    (2006.01)
  H04L 29/06    (2006.01)
  H04L 29/14    (2006.01)
  G06F 12/14    (2006.01)

(52) U.S. Cl.
  CPC ........ H04L 63/1408 (2013.01); H04L 63/0209 (2013.01); H04L 63/0227 (2013.01); H04L 69/40 (2013.01)

(58) Field of Classification Search
  CPC . H04L 63/1408; H04L 69/40; H04L 63/0209; H04L 63/0227; H04L 63/105; H04L 67/00; H04L 67/34; H04L 67/38
  USPC .......................................................... 726/22
  See application file for complete search history.

(56) References Cited

U.S. PATENT DOCUMENTS

| | | | |
|---|---|---|---|
| 5,703,562 A | 12/1997 | Nilsen | |
| 7,675,867 B1 * | 3/2010 | Mraz et al. | 370/254 |
| 7,870,608 B2 * | 1/2011 | Shraim et al. | 726/22 |
| 7,941,526 B1 * | 5/2011 | Hope | H04L 41/069 709/224 |
| 7,992,209 B1 * | 8/2011 | Menoher | H04L 63/105 726/16 |
| 8,139,581 B1 * | 3/2012 | Mraz | H04L 63/105 370/392 |
| 2006/0068755 A1 * | 3/2006 | Shraim et al. | 455/410 |
| 2006/0085860 A1 * | 4/2006 | Zou et al. | 726/26 |
| 2006/0195588 A1 * | 8/2006 | Pennington | G06F 21/53 709/227 |
| 2011/0087769 A1 * | 4/2011 | Holmes | G06Q 30/00 709/224 |
| 2012/0017079 A1 * | 1/2012 | Mraz | H04L 9/3236 713/153 |
| 2012/0017274 A1 * | 1/2012 | Schrecker | G06F 21/577 726/22 |
| 2012/0036580 A1 * | 2/2012 | Gorny | H04L 63/1433 726/25 |
| 2012/0162697 A1 | 6/2012 | Mraz et al. | |
| 2013/0054682 A1 * | 2/2013 | Malik et al. | 709/203 |
| 2014/0181129 A1 * | 6/2014 | Thomas | 707/758 |
| 2014/0337424 A1 * | 11/2014 | Lee | H04L 63/0823 709/204 |

* cited by examiner

*Primary Examiner* — Ashok Patel
*Assistant Examiner* — Gary Gracia
(74) *Attorney, Agent, or Firm* — John S. Economou

(57) ABSTRACT

A system is disclosed for monitoring the status of a website operating on a host and for remedying any identified problems. A first platform is coupled to the host for monitoring the website and periodically transmits status information about the website. A second platform is coupled to the first platform for periodically receiving the status information about the at least one feature. The second platform is configured to compare the received status information with a copy of the website and based thereon determine if the website has been compromised. The second platform is further configured to output an alert signal after determining that the website has been compromised. A third platform is coupled to the second platform and separately coupled to the host computer. The third platform is configured to receive the alert signal from the second platform and to forward the alert signal to the host computer.

15 Claims, 2 Drawing Sheets

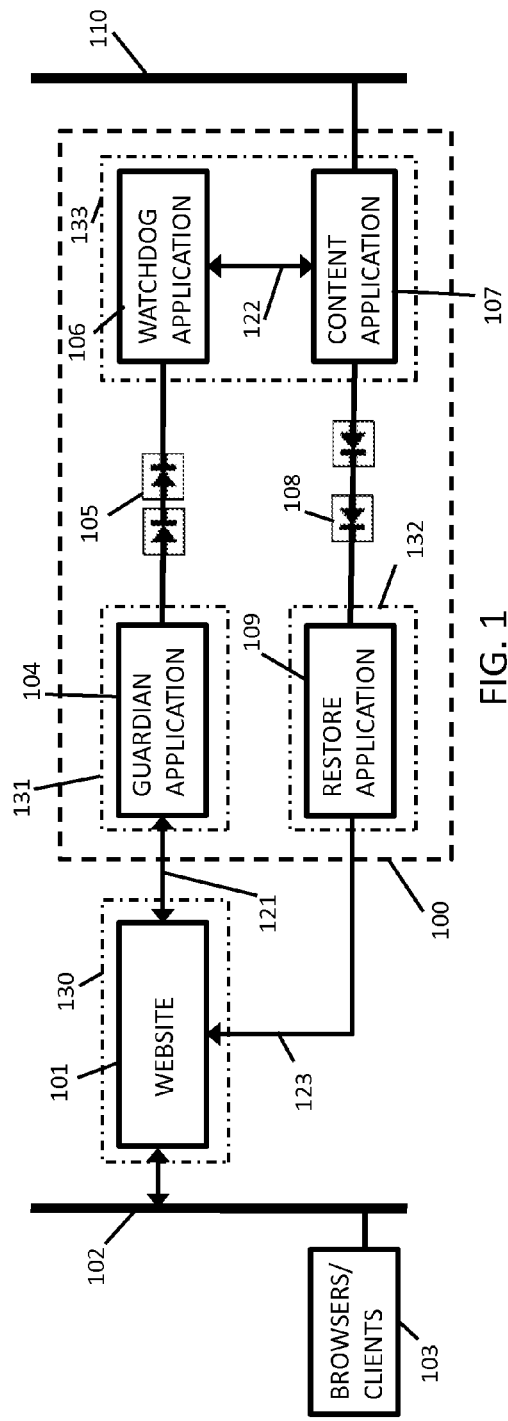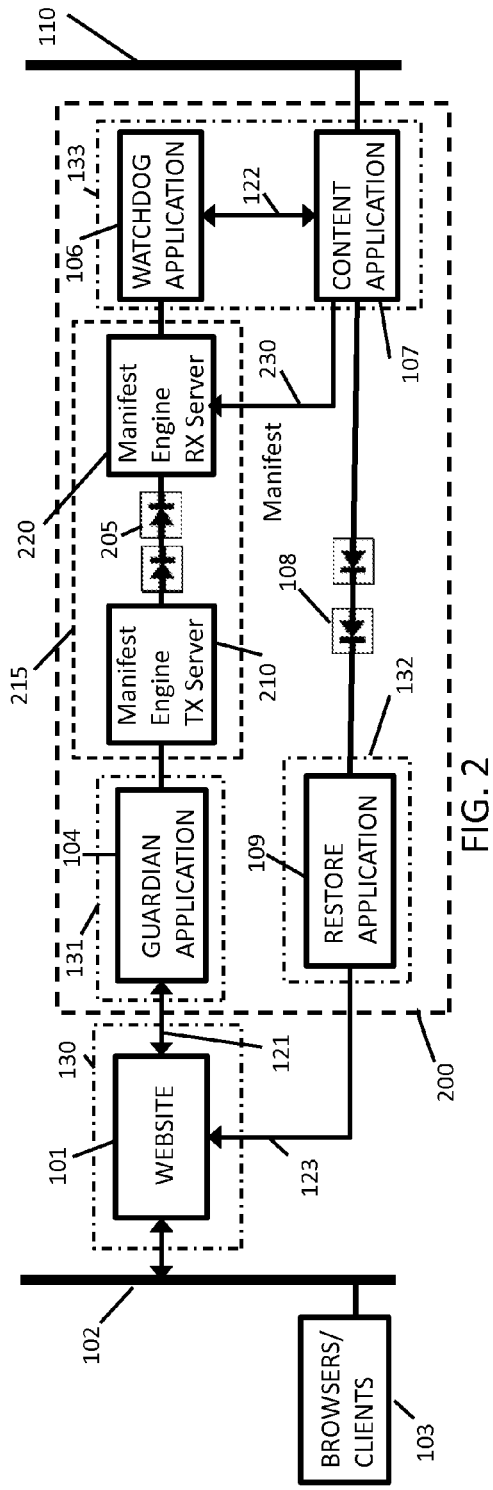

SYSTEM AND METHOD FOR IMPROVING THE RESILIENCY OF WEBSITES AND WEB SERVICES

FIELD OF INVENTION

This invention relates generally to a system and method that continuously monitors the integrity of a website or web service and takes remedial action if and when a problem is detected.

BACKGROUND OF THE INVENTION

Most businesses depend on an online presence, usually connected to the World Wide Web, for a myriad of critical functions, from consumer and business-to-business transaction portals to marketing and communications. It is therefore extremely important for this online presence and the processes and services it supports to run with as few interruptions as possible, including those caused by malicious activities.

Many attempts have been made to protect websites and web services from failures, whether caused my malicious activities, environmental factors or malfunction. In addition, there are services which monitor their liveness and performance, and notify the owner when these fall outside permissible ranges. Still, there are gaps in the protection and monitoring of websites and web services which allow interruptions to services, or worse yet, modification and possible defacing of the same. For the purposes of this application, a website is considered compromised whenever any unauthorized change has been made to any feature thereof.

It is an object of the present invention to provide a system and method for website monitoring which overcomes the problems with the prior art.

SUMMARY OF THE INVENTION

The present invention describes a system and method that continuously monitors the integrity of a website or web service and takes remedial action if a problem is detected. It further features the protection and isolation of the monitoring mechanism, as well as the information needed to restore the monitored website or web service. This approach does not prevent a website or web service from being attacked. Rather, it helps the website or web service to automatically recover from such an attack.

The present invention provides a system for monitoring status of a website operating on a host platform and for remedying any problems identified by such monitoring. The system includes a first platform, a second platform and a third platform. The first platform has a first connection coupled to the host platform for monitoring at least one feature of the website. The first platform is configured to periodically transmit status information about the at least one feature on a second connection. The second platform has a first connection coupled to the second connection of the first server for periodically receiving the status information about the at least one feature and a second connection. The second platform is configured to compare the received status information with a copy of the website stored on the second platform and based thereon determine if the website has been compromised. The second platform is further configured to output an alert signal on a second connection after determining that the website has been compromised. The third platform has a first connection coupled to the second connection of the second platform and a second connection coupled to the host computer. The third platform is configured to receive the alert signal from the second server and forward the alert signal to the host computer.

BRIEF DESCRIPTION OF THE DRAWINGS

The following detailed description, given by way of example and not intended to limit the present invention solely thereto, will best be understood in conjunction with the accompanying drawings in which:

FIG. 1 is a first embodiment of a website monitoring and restoration system;

FIG. 2 is a second embodiment of a website monitoring and restoration system.

DETAILED DESCRIPTION OF THE PREFERRED EMBODIMENTS

Figure 3:
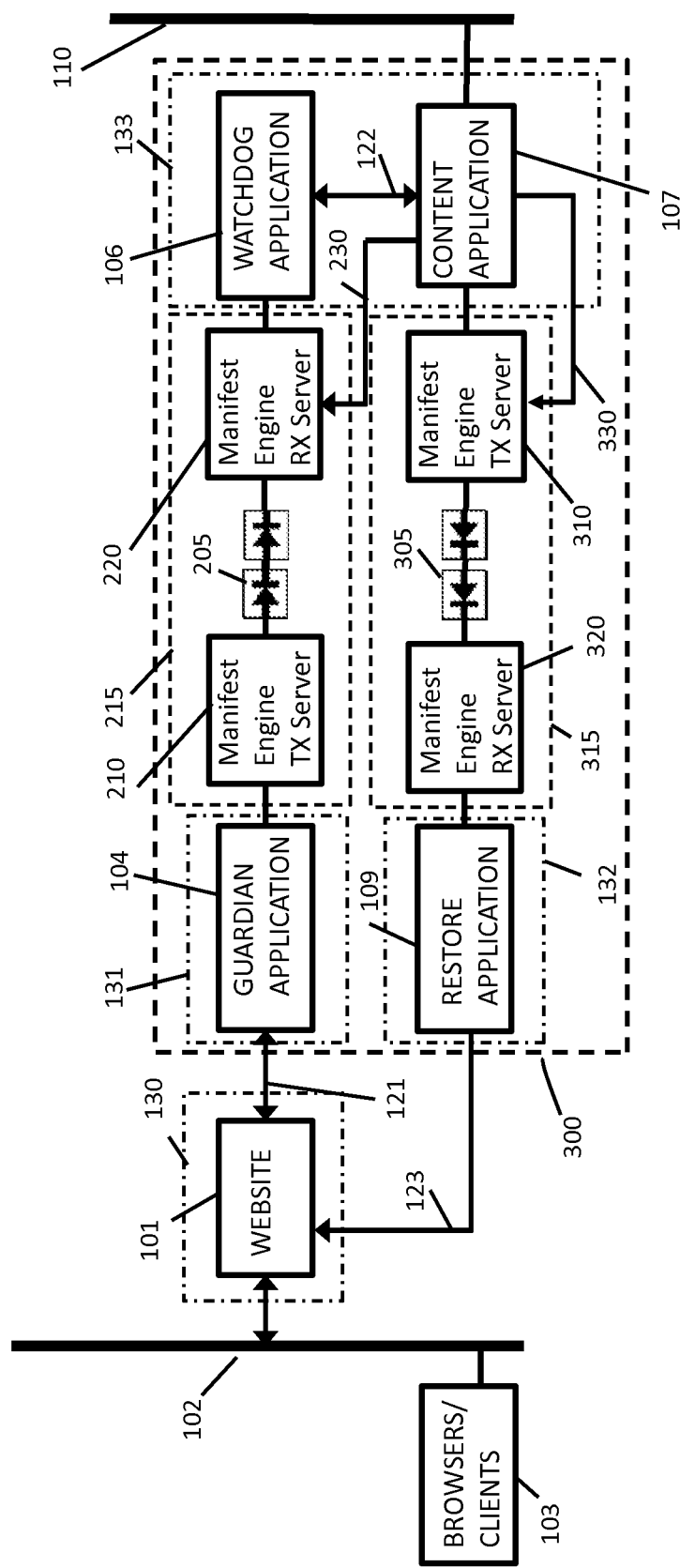
FIG. 3 is a third embodiment of a website monitoring and restoration system.

In the present disclosure, like reference numbers refer to like elements throughout the drawings, which illustrate various exemplary embodiments of a website monitoring and restoration system.

FIG. 1 shows a website 101 operating on a hardware platform 130 (computer or server) connected to the Internet or some other external network 102. In such a configuration, website 101 may be exposed to malicious attacks. For example, in operation, website 101 may be accessed by browsers/clients 103, either manually or programmatically, through the network connection 101, and in some cases a client 103 may attempt to cause damage to website 101, e.g., by overwriting, deleting, adding or modifying the web content (files) on website 101. To help protect website 101, system 100 is provided to monitor and, if necessary, restore the web content on website 101.

In particular, system 100 includes a guardian application 104 operating on hardware platform 131 that is coupled to the monitored website 101 via connection 121. The connection 121 between hardware platform 130 and hardware platform 131 may either be a separate direct connection as shown in FIG. 1 or via a shared network. The shared network may either be an external network such as network 102 shown in FIG. 1 or a separate backchannel network. A watchdog application 106 running on a hardware platform 133 is coupled to hardware platform 131 to receive information from guardian application 104. The coupling between hardware platforms 131 and 133 is preferably via a one-way data link 105 (as shown in FIG. 1) but may also be via a conventional two-way link. Watchdog application 106, in turn, is coupled to a content application 107 via connection 122. Watchdog application 106 and content application 107 are shown operating on a common hardware platform 133 in FIG. 1, but as one of ordinary skill in the art will readily recognize, in the alternative separate hardware platforms may be provided for each application, with connection 122 coupling the separate hardware platforms. Hardware platform 133 is coupled to an internal network 110 so that content application 107 can receive information via the internal network. For example, an administrator may update a particular website by uploading the modified contents (i.e., the updated website) to content application 107 via network 110. Once the modified contents are present at content application 107, system 100 can be configured to automatically update website 101 as discussed below (since the status check will fail based on the modified contents). Hardware platform 133 is also coupled, either via a one-way data link 108 (as shown in FIG. 1) or via a conventional two-way link, to a hardware platform 132 running a restore application 109. Finally hardware platform 132 is also coupled to hardware platform 130 via a separate dedicated connection 123.

In operation, guardian application 104 is configured to periodically read from website 101, directly or optionally by using credentials, some or all of the files which website 101 uses to carry out its functions (i.e., the files comprising one or more particular websites hosted on website 101). As one of ordinary skill in the art will readily recognize, such files may include website page files and associated scripts and other types of supporting files.

Guardian application 101 periodically sends the results of its monitoring, either as an abbreviated status signal or as a full set of the files read from website 101 to watchdog application 106. As discussed above, this transfer may be via a conventional two-way connection but is preferably via a one-way data link 105 which includes file scanning (e.g., to perform malware and virus scanning of the files to be transferred across the one-way pathway) to protect the integrity of watchdog application 106. U.S. patent publication no. 2012/0162697 to Mraz et al., the content of which is hereby incorporated by reference in its entirety, discloses a one-way data link which incorporates file scanning in the context of print files.

Watchdog application 106 expects to periodically receive information from guardian application 104. When the information is received, watchdog application 106 inspects the information for correctness and completeness by comparing such information to the corresponding information stored by content application 107. Dynamic information, such as time stamps, may either be exempted from this comparison or in the alternative checked only for proper range. The inspection may involve comparisons of one or more of the following: full files, file names, file lengths, specific data contained therein, signatures (MD5, SHAxx, etc.), creation/modification/last access dates, log inspection, credentials (possibly including IP address) used to access, metadata or any other distinctive information. As one of ordinary skill in the art will readily recognize, there are many ways to inspect the information, and all possible methods are included within the scope of the present invention.

When the watchdog application 106 fails to receive the expected information within a specified time period or when the expected information arrives within the designated time period but fails any of the correctness or completeness checks, the website is considered compromised and watchdog application 106 provides a corrective action (alert) signal to content application 107. Upon receipt of such signal, content application 107 then signals restore application 109 to take control of website 101 and restore its functionality. In addition, content application 107 preferably also sends all the information needed to rebuild and restart website 101 to restore application 109.

Restore application 109, upon receiving the signal and preferably the rebuild/restart information from content application 107, takes one or more actions, depending on predefined policies and procedures and on the state of website 101. The actions taken can range from a simple shutdown/restart of individual services to a full reinstall and reboot of the computer hosting website 101, based on settings preselected by the user or defined at installation. In a further embodiment, website 101 may be replicated, with one or more copies running on hardware platform 130 and kept on standby. In this further embodiment, when restore application 109 receives a signal from content application 107 indicating that action is required, the first step taken is to switch the connection to the external network 102 to the first (or next) standby copy, prior to restoring/restarting the suspect website 101. In some cases, it may also be desirable to preserve a suspect copy of website 101 for forensic purposes.

The system 100 shown in FIG. 1 may be used to guard a single website 101, or multiple websites (additional websites not shown). System 100 may be used in an in-house setup, where system 100 and the guarded system or systems (i.e., websites 101) are co-located, or in a remote setup, e.g., by a website hosting service, whether on premise or via a remote connection.

Furthermore, the connection between internal network 110 and content application 107 may be protected by a one-way data link or a manifest transfer engine (discussed below), as well as by the use of login credentials. In addition to acting on a signal from a watchdog application 106, the content application 107 may use the restore process to install a new version/release of the website 101, updating the relevant manifests (for the associated manifest transfer engine) if needed (as discussed with respect to FIG. 2 below). Internal network 110 provides an internal gateway for dynamically updating the contents of website 101, as in one further embodiment any change made to the information on content application 107 will then be used to update website 101.

The connection 123 between the restore application 109 and the website 101 may include the ability to hard-reset the host computer for the website 101. The connection 123 to website 101 may also be protected by login credentials.

Referring now to FIG. 2, a first alternative embodiment is shown in which the connection between guardian application 104 on hardware platform 131 and watchdog application 106 on hardware platform 133 is made via a manifest transfer engine 215. Manifest transfer engine 215 is described in detail in U.S. patent application Ser. No. 13/747,771 to Mraz ("the '771 application"), published as U.S. patent publication No. 2014/0020109, the content of which is hereby incorporated by reference in its entirety. Manifest transfer engine 215 provides an alternative way to address the network security concerns. Manifest transfer engine TX server 210 transfers the information from guardian application 109 across a one-way data link 205 to a manifest engine RX server 220. The one-way data link 205 is optional (i.e., a conventional two-way link may be alternatively used) and provides an additional level of security as no information can pass from manifest engine RX server 220 to manifest engine TX server 210. Manifest engine RX server 220 receives the information from manifest engine TX server 210 on a first connection and a manifest from the content server 220 on a second connection, and only passes the received information which is identified on the manifest to watchdog application 106. FIG. 2 shows that manifest engine RX server 220 receives the manifest on the RX side (i.e., via connection 230), but in the alternative line 230 could be alternatively coupled to manifest engine TX server 210, in which case only the received information identified on the manifest would be passed to the one-way link 205. The manifest itself defines which files and/or status messages are allowed to pass from the guardian application 104 to watchdog application 106. In all other respects, system 200 operates in the same manner as system 100.

Referring now to FIG. 3, a second alternative embodiment is shown which includes a second manifest transfer engine 315 for controlling the flow of information from content application 107 to restore application 109. Manifest transfer engine 315 operates similarly to manifest transfer engine 215 (and as described in the '771 application), with the manifest preferably supplied to manifest engine TX server 310 via connection 330. Manifest engine TX server 310 receives information from content application 107, and only passes that information identified on the manifest to manifest engine RX server 320 via one-way data link 305 (as discussed above with respect to FIG. 2, although a one-way link 305 is shown, a conventional two-way link may be used instead of one-way data link 305). Manifest engine RX server 320 receives the information from manifest engine TX server 310 and forwards such information to restore application 109. In all other respects, system 300 operates in the same manner as system 200.

Although the present invention has been particularly shown and described with reference to the preferred embodiments and various aspects thereof, it will be appreciated by those of ordinary skill in the art that various changes and modifications may be made without departing from the spirit and scope of the invention. It is intended that the appended claims be interpreted as including the embodiments described herein, the alternatives mentioned above, and all equivalents thereto.

What is claimed is:

1. A system for monitoring status of a particular website operating on a host hardware platform, the website formed from one or more files stored on the host hardware platform, and for remedying any problems identified by such monitoring, comprising:
 a first hardware platform having a first connection coupled to the host hardware platform, for monitoring at least one feature of the website by periodically reading at least one of the files forming the website and configured to periodically transmit status information about the at least one feature on a second connection, the second connection separate from the first connection;
 a second hardware platform having a first connection coupled to the second connection of the first hardware platform for periodically receiving the status information about the at least one feature and a second connection, the second hardware platform configured to compare the received status information with a copy of the website files stored on the second hardware platform and based thereon determine if the website has been compromised, the second hardware platform further configured to output an alert signal on the second connection after determining that the website has been compromised;
 a third hardware platform having a first connection coupled to the second connection of the second hardware platform and a second connection coupled to the host hardware platform via a separate dedicated connection and configured to receive the alert signal from the second hardware platform and forward the alert signal to the host hardware platform via the separate dedicated connection; and
 wherein the second connection of the second hardware platform is coupled to the first connection of the third hardware platform only via a manifest transfer engine configured to receive a manifest from the second hardware platform, to receive information from the second connection of the second hardware platform and to pass the received information to the first connection of the third hardware platform only if the received information is identified in the manifest, and wherein the manifest defines which information is allowed to pass from the second hardware platform to the third hardware platform.

2. The system of claim 1, wherein the second connection of the first hardware platform is coupled to the first connection of the second hardware platform only via a one-way data link.

3. The system of claim 1, wherein the second connection of the second hardware platform is coupled to the first connection of the third hardware platform only via a one-way data link.

4. The system of claim 1, wherein the second hardware platform is further configured to output the copy of the website files on the second connection after determining that the website has been compromised and wherein the third hardware platform is further configured to receive the copy of the website files from the second server and forward the copy of the website to the host hardware platform along with the alert signal.

5. The system of claim 1, wherein the status information comprises one or more complete files constituting the website.

6. The system of claim 1, wherein the status information comprises a list of one or more filenames for files constituting the website.

7. The system of claim 1, wherein the status information comprises portions of one or more complete files constituting the website.

8. The system of claim 1, wherein the status information comprises signature information for one or more complete files constituting the website.

9. The system of claim 1, wherein the status information comprises file creation information for one or more complete files constituting the website.

10. The system of claim 1, wherein the status information comprises credential information for one or more complete files constituting the website.

11. The system of claim 1, wherein the status information comprises metadata for one or more complete files constituting the website.

12. The system of claim 1, wherein the host hardware platform is coupled to a first network for public access by one or more users and wherein the second hardware platform is coupled to a second network for private access by an administrator.

13. The system of claim 1, wherein the first connection of the first hardware platform is coupled to the host hardware platform via a dedicated connection.

14. The system of claim 1, wherein the first connection of the first hardware platform is coupled to the host hardware platform via a public network.

15. A system for monitoring status of a particular website operating on a host hardware platform, the website formed from one or more files stored on the host hardware platform, and for remedying any problems identified by such monitoring, comprising:
 a first hardware platform having a first connection coupled to the host hardware platform for monitoring at least one feature of the website by periodically reading at least one of the files forming the website and configured to periodically transmit status information about the at least one feature on a second connection, the second connection separate from the first connection;
 a second hardware platform having a first connection coupled to the second connection of the first hardware platform for periodically receiving the status information about the at least one feature and a second connection, the second hardware platform configured to compare the received status information with a copy of the website files stored on the second hardware platform and based thereon determine if the website has been compromised, the second hardware platform further configured to output an alert signal on the second connection after determining that the website has been compromised;

a third hardware platform having a first connection coupled to the second connection of the second hardware platform and a second connection coupled to the host hardware platform via a separate dedicated connection and configured to receive the alert signal from the second hardware platform and forward the alert signal to the host hardware platform via the separate dedicated connection; and wherein the second connection of the first hardware platform is coupled to the first connection of the second hardware platform only via a manifest transfer engine configured to receive a manifest from the second hardware platform, to receive information from the second connection of the first hardware platform and to pass the received information to the first connection of the second hardware platform only if the received information is identified in the manifest, and wherein the manifest defines which information is allowed to pass from the first hardware platform to the second hardware platform.

* * * * *